US006135415A

United States Patent [19]

Kloda et al.

[11] Patent Number: 6,135,415

[45] Date of Patent: Oct. 24, 2000

[54] EXHAUST GAS RECIRCULATION ASSEMBLY

[75] Inventors: Martin Kloda, Köln; Stefan Goedtner, Hennef; Heike Spona, Duisburg; Clemens Müssen, Siegburg, all of Germany

[73] Assignee: Siemens Canada Limited, Mississauga, Canada

[21] Appl. No.: 09/126,160

[22] Filed: Jul. 30, 1998

[51] Int. Cl.[7] .......... F02M 25/07; F16K 31/04; F16K 31/53

[52] U.S. Cl. .......... 251/129.11; 257/250.5; 123/568.18; 123/568.24

[58] Field of Search .......... 251/129.11, 250.5, 251/306; 123/568.17, 568.18, 568.23, 568.24

[56] References Cited

U.S. PATENT DOCUMENTS

| | | | |
|---|---|---|---|
| 4,020,809 | 5/1977 | Kern et al. | 123/568.24 |
| 4,395,017 | 7/1983 | Brautigan | 251/306 |
| 4,427,023 | 1/1984 | Greaves | 251/250.5 X |
| 4,656,926 | 4/1987 | Bauer et al. | 251/250.5 X |
| 4,924,840 | 5/1990 | Wade | 123/568.24 X |
| 5,531,205 | 7/1996 | Cooke et al. | 123/568.24 |
| 5,647,399 | 7/1997 | Andersen | 251/250.5 X |
| 5,746,190 | 5/1998 | Honda | 123/568.18 |
| 5,809,780 | 9/1998 | Jong et al. | 251/250.5 X |
| 5,881,994 | 3/1999 | Stevenson et al. | 251/250.5 |
| 5,937,835 | 8/1999 | Turner et al. | 123/568.24 |

FOREIGN PATENT DOCUMENTS

| | | |
|---|---|---|
| 0752528 A1 | 1/1997 | European Pat. Off. . |
| 0 533 546 A1 | 3/1993 | France . |
| 4424644C1 | 11/1995 | Germany . |
| 19607811 A1 | 9/1997 | Germany . |

*Primary Examiner*—John Rivell

[57] ABSTRACT

The present invention provides an exhaust gas recirculation assembly. The exhaust gas recirculation assembly includes a single housing having an integrated airflow passage, a recirculated exhaust gas passage, and valve mechanism. The airflow passage is operatively positioned to allow continued flow of air through a throttle body and an intake manifold of an air induction system. The valve mechanism is disposed within the exhaust gas recirculation passage and controls the flow of recirculated exhaust gas through the recirculated exhaust gas passage into the airflow passage. The valve mechanism, preferably, comprises a butterfly valve. An electric actuator, which is also integrated into the housing, operates the valve mechanism.

12 Claims, 10 Drawing Sheets

EXHAUST GAS RECIRCULATION ASSEMBLY

FIELD OF INVENTION

The invention relates to assemblies for controlling the recirculation of exhaust gas. More particularly, the invention relates to valves that are operated by an electric actuator to control the flow of the recirculated exhaust gas to an engine.

BACKGROUND

U.S. Pat. No. 5,531,205 issued to Cook et al., entitled "Rotary Diesel Electric EGR Valve," teaches a butterfly valve operated by an electric actuator. Cook et al. teaches that a seal is formed in the housing structure adjacent the butterfly valve. Cook et al. also teaches that the electric actuator is a rotary torque motor. The rotary torque motor provides an operative range of substantially 45° rotation for the shaft to which the butterfly valve is connected. The shaft is operatively connected to the rotary torque motor by a clip, which could fail after repeated loading. Due to the clip connection, the rotary torque motor is supported at an obtuse angle relative to the passage of exhaust gas flow. This orientation may limit the packaging configurations for the valve and electric actuator.

SUMMARY OF THE INVENTION

The present invention provides an exhaust gas recirculation assembly. The exhaust gas recirculation assembly includes an airflow passage and a valve mechanism. The airflow passage is operatively positioned to allow continued flow of an air induction system. More particularly, the airflow passage allows airflow between a throttle body and an intake manifold. The valve mechanism controls the flow of recirculated exhaust gas through a recirculated exhaust gas passage into the airflow passage.

The airflow passage and the valve mechanism are integrated into a single housing. The airflow passage traverses the housing along a longitudinal axis. In a first embodiment, the recirculated exhaust gas passage includes an outlet that is substantially parallel with the longitudinal axis. The parallel outlet configuration directly feeds recirculated exhaust gas into the airflow passage. In a second embodiment, the recirculated exhaust gas passage includes an outlet that is substantially perpendicular to the longitudinal axis. For the perpendicular outlet configuration, a radial canal is provided in the housing to feed recirulated exhaust gas from the recirculated exhaust gas passage to the airflow passage.

The valve mechanism is disposed within the exhaust gas recirculation passage. An electric actuator operates the valve mechanism. The electric actuator includes a shaft that extends through the airflow passage. The air flowing through the airflow passage cools the shaft. The valve mechanism and the electric actuator are, preferably, disposed on opposite sides of the longitudinal axis of the airflow passage.

The valve mechanism comprises a butterfly valve. The butterfly valve includes a flap with a split ring that seals against a valve seat provided proximate the inlet of the recirculated exhaust gas passage.

The electric actuator comprises a DC motor that drives the shaft through a gear train. The gear train includes, at least, a segment gear operatively fixed to the shaft and a driver gear driven directly by the DC motor. One or more intermediate gears may be used between the segment and driver gears depending on the location of the shaft and the DC motor in the housing assembly.

DETAILED DESCRIPTION OF THE DRAWINGS

The accompanying drawings, which are incorporated herein and constitute part of this specification, include at least two presently preferred embodiments of the invention, and together with a general description given above and a detailed description given below, serve to disclose principles of the invention in accordance with the best mode contemplated for carrying out the invention.

DETAILED DESCRIPTION OF THE PREFERRED EMBODIMENTS OF THE INVENTION

Figure 1:
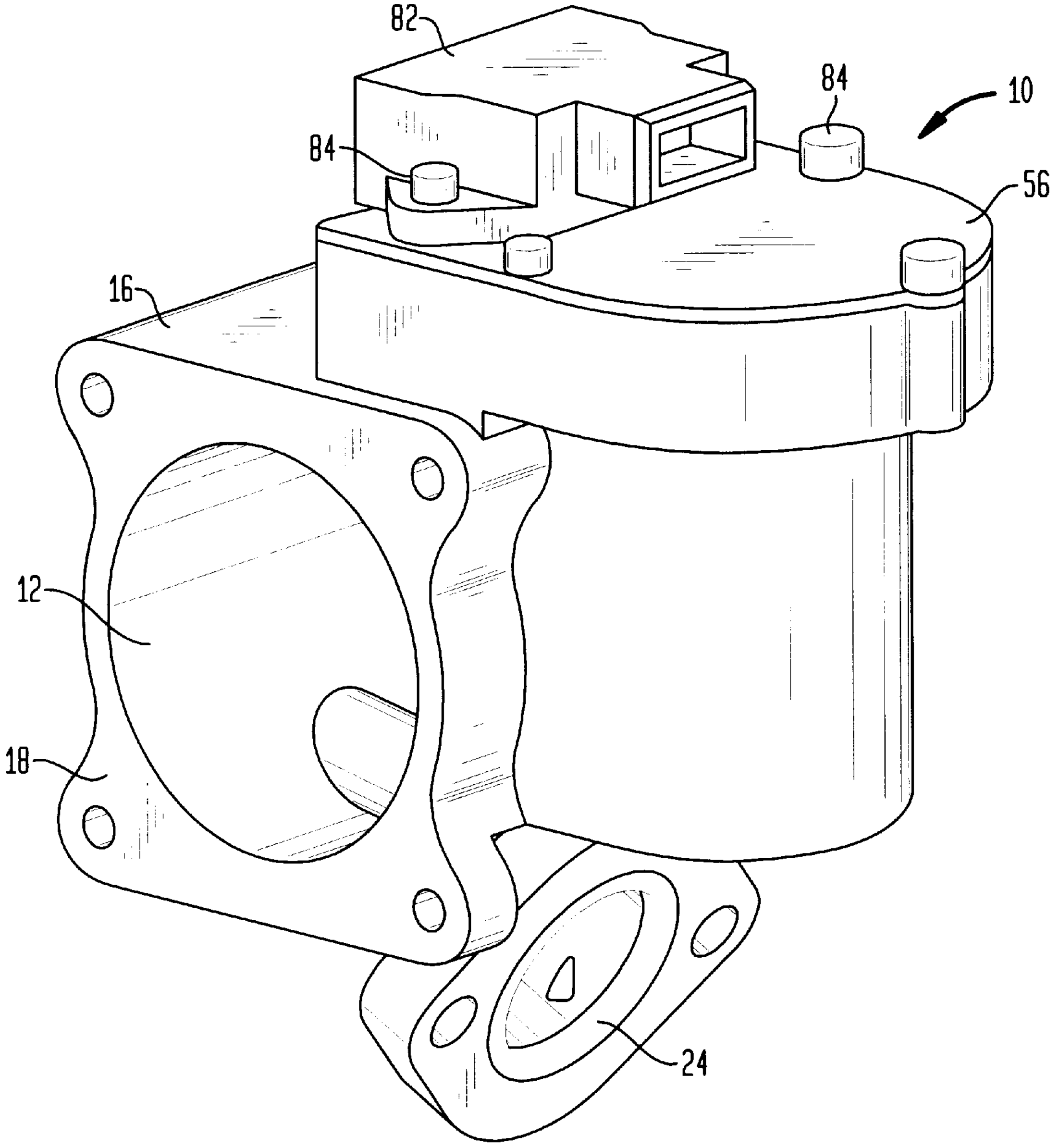
FIG. 1 shows a perspective view of a first embodiment of the invention.
Figure 2:
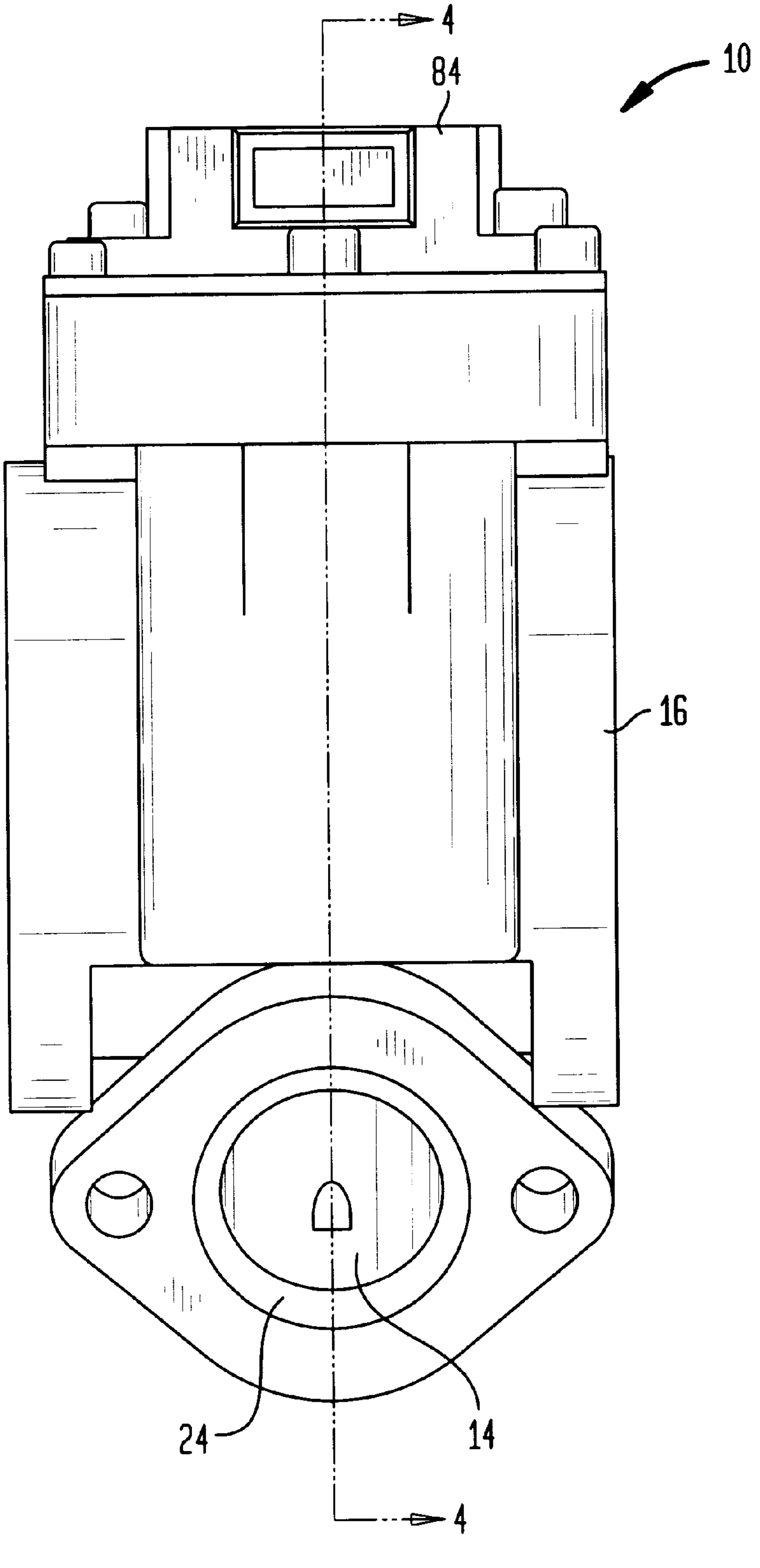
FIG. 2 shows a front view of the first embodiment of the invention shown in FIG. 1.
Figure 3:
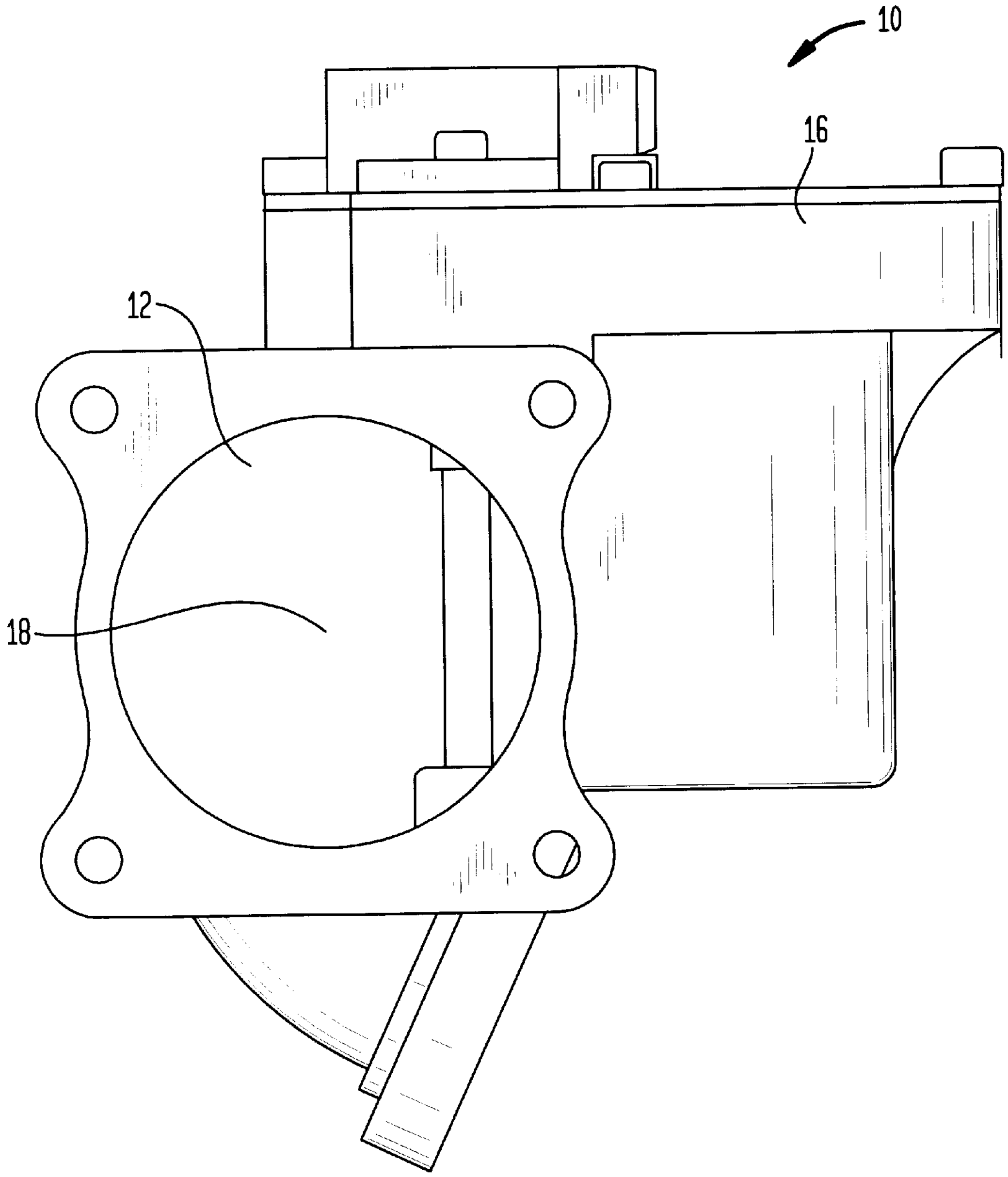
FIG. 3 shows a side view of the first embodiment invention shown in FIG. 1.
Figure 4:
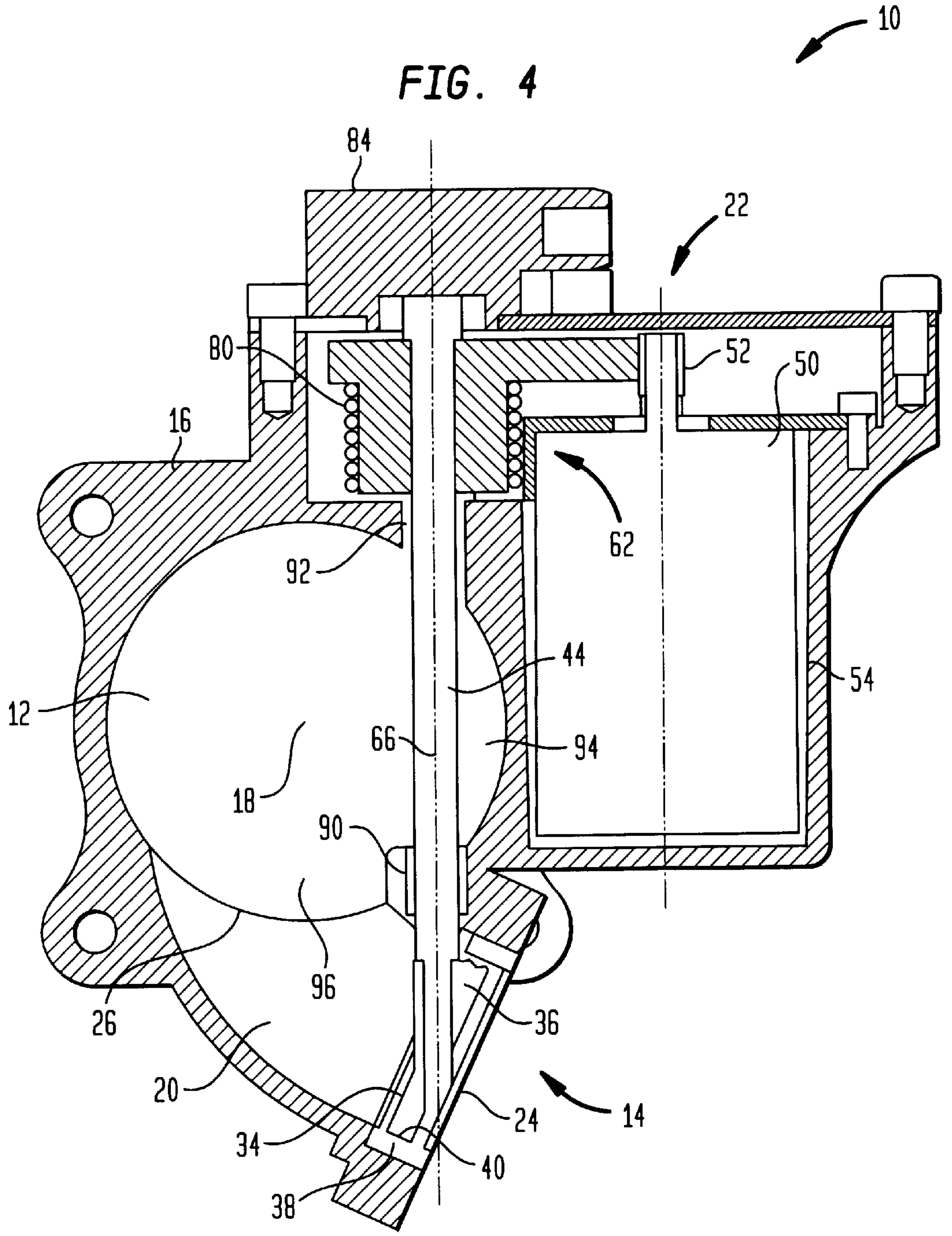
FIG. 4 shows a cross-sectional side view taken along the section line 4—4 shown in FIG. 2.
Figure 5:
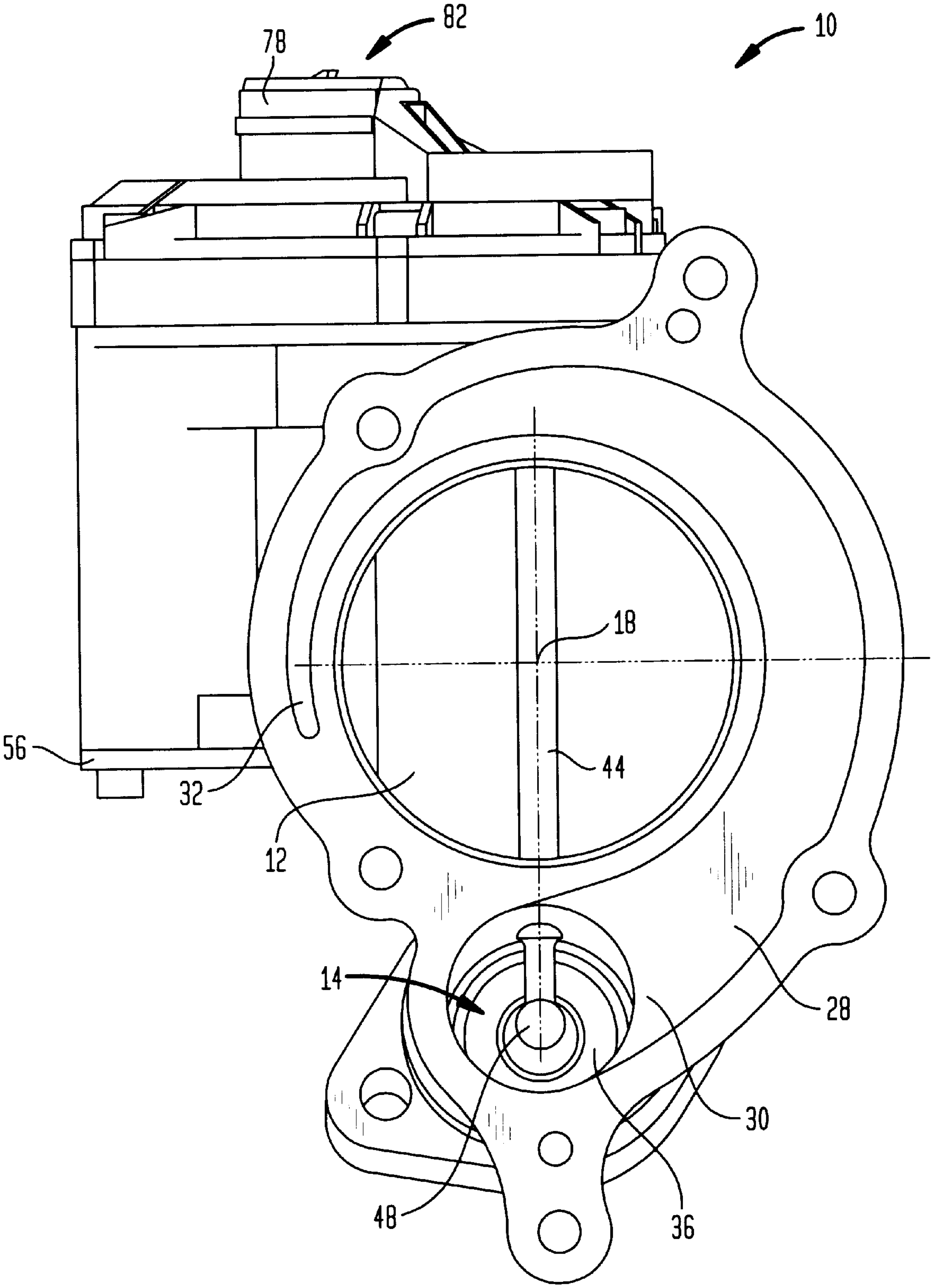
FIG. 5 is a front view of a second embodiment of the invention.
Figure 6:
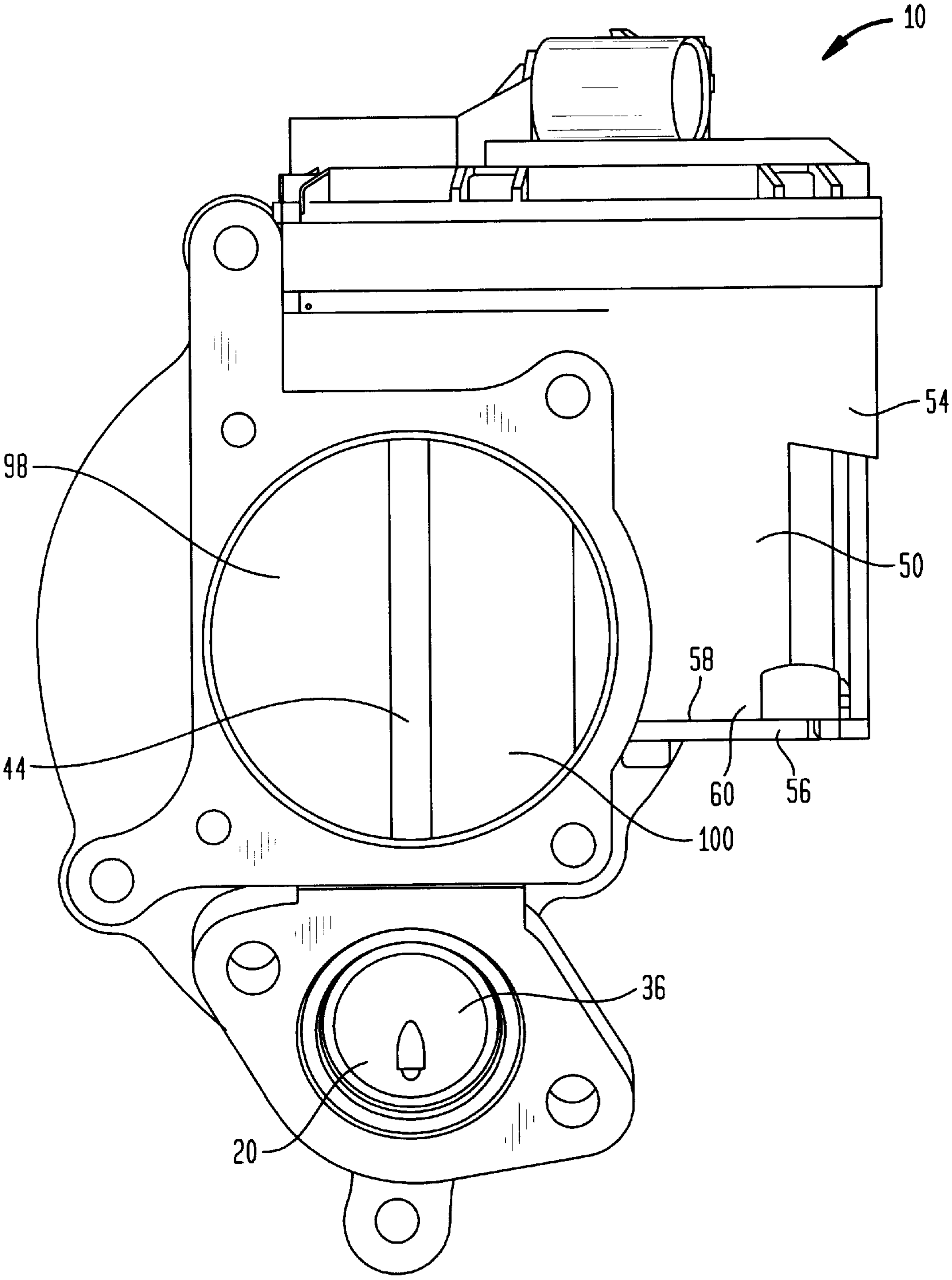
FIG. 6 is a back view of the second embodiment of the invention.
Figure 7:
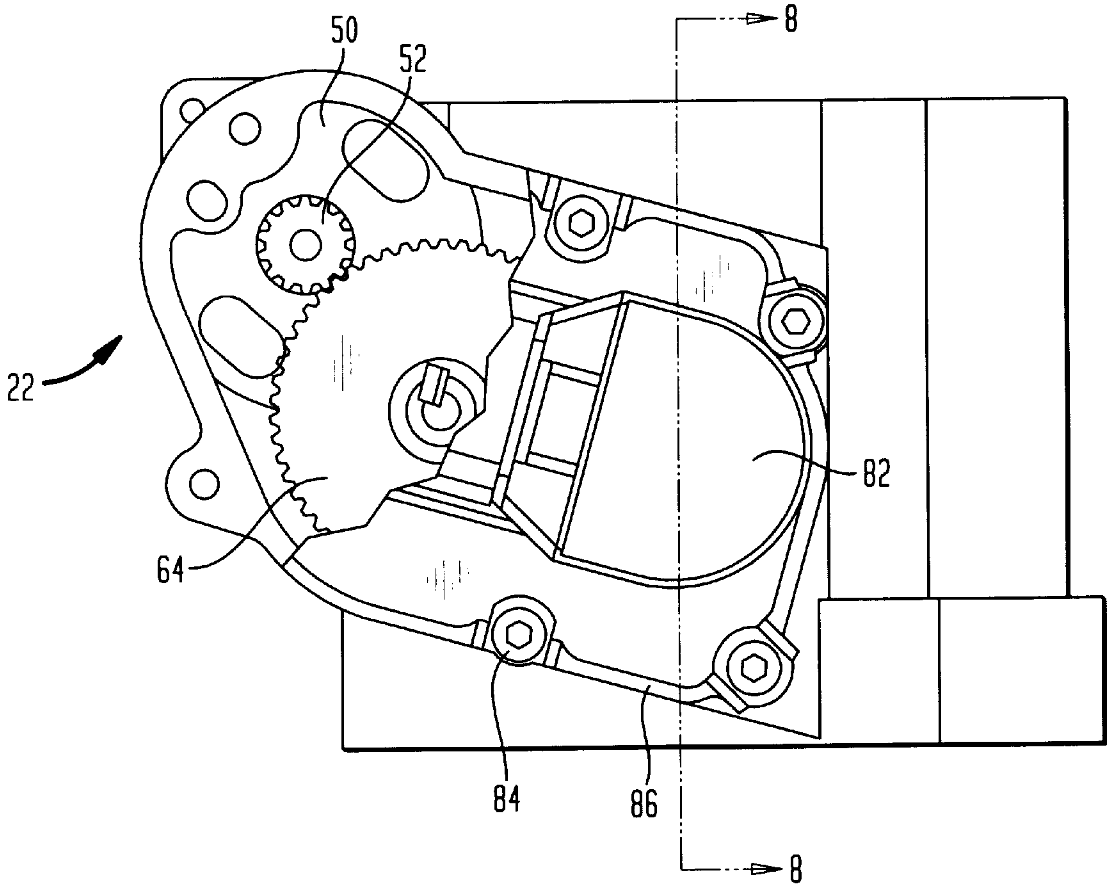
FIG. 7 is a partial top sectional view of the second embodiment of the invention.
Figure 8:
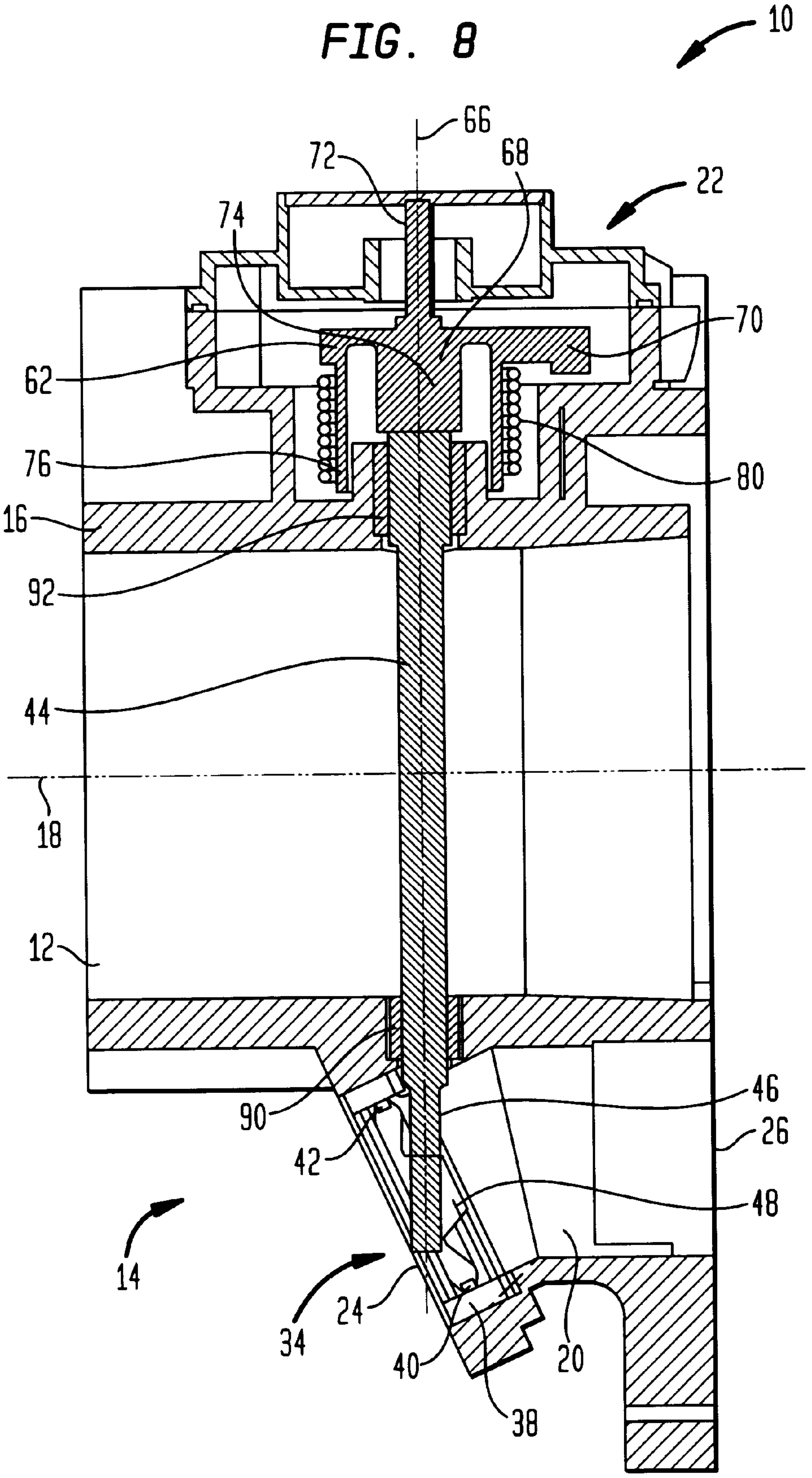
FIG. 8 is a cross-sectional view of the second embodiment of the invention taken along the section line 8—8 in FIG. 7.
Figure 9A:
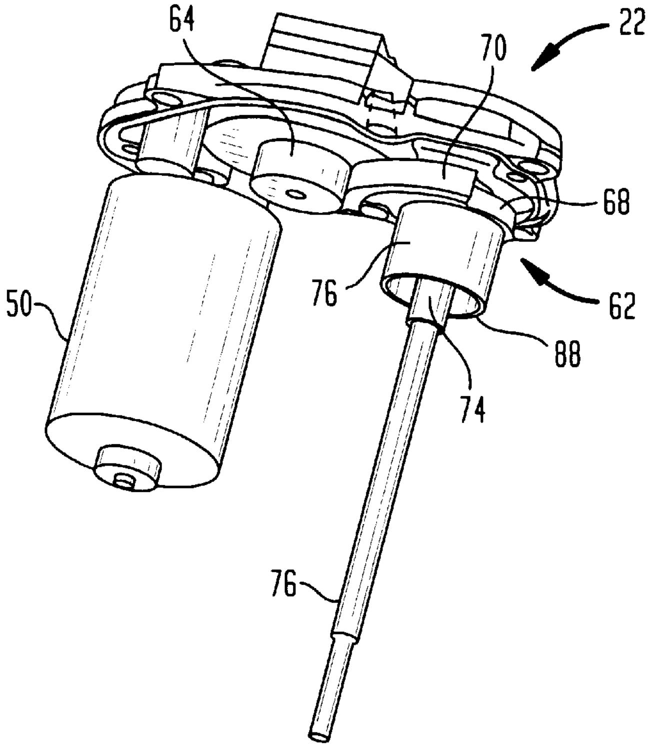
FIG. 9A is a perspective view of the electric actuator of the second embodiment of the invention shown in FIGS. 4–8.
Figure 9B:
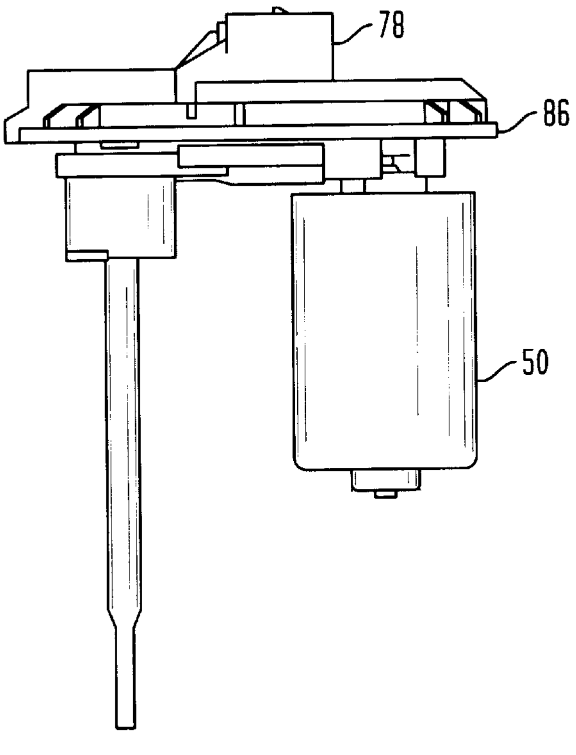
FIG. 9B is a side view of the electric actuator shown in FIG. 9.
Figure 9C:
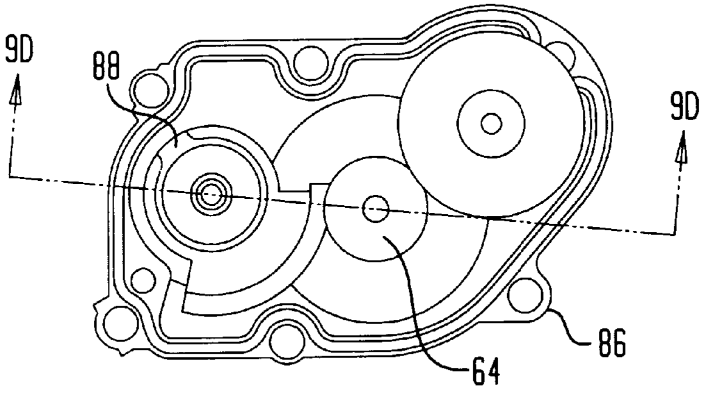
FIG. 9C is a bottom view of the electric actuator shown in FIG. 9.
Figure 9D:
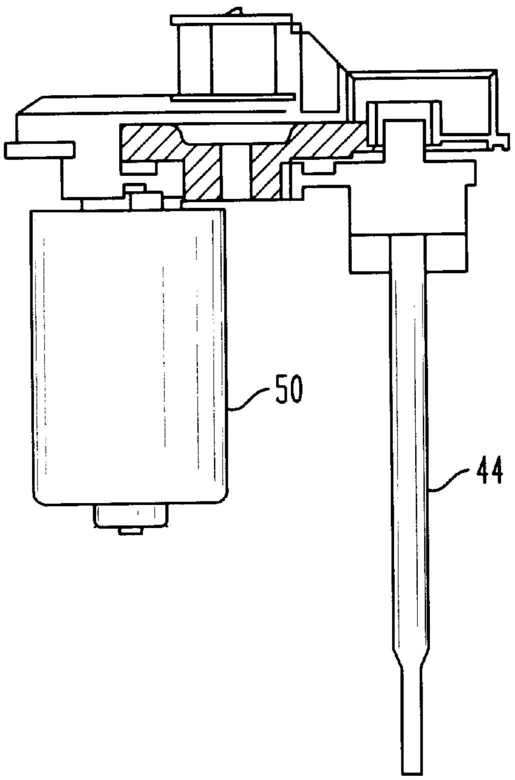
FIG. 9D is a cross-sectional view of the electric actuator taken along the cross-sectional line 9D—9D shown in FIG. 11.

The figures illustrate first and second embodiments of the exhaust gas recirculation (EGR) assembly 10, wherein similar reference numbers designate similar parts. The EGR assembly 10 includes an airflow passage 12 and a valve mechanism 14. The airflow passage 12 and the valve mechanism 14 are integrated into a single housing 16. The airflow passage traverses the housing 16 along a longitudinal axis 18.

The EGR assembly 10 is configured so that airflow passage 12 operatively connects the airflow passages of a throttle body and an intake manifold in an air induction system. That is, the airflow passage inlet operatively connects to a throttle body and the airflow passage outlet operatively connects to the inlet of the intake manifold.

The housing 16 also includes a recirculated exhaust gas passage 20 operatively connected to the airflow passage 12. The recirculated exhaust gas passage 20 is positioned at a first side, preferably a lower portion when the EGR assembly 10 is orientated in a vehicle, of the longitudinal axis 18 of the airflow passage 12. Recirculated exhaust gas is metered through the recirculated exhaust gas passage 20 by a valve mechanism 14 disposed within the recirculated exhaust gas passage 20. The valve mechanism is operatively positioned by an electric actuator 22 located on a second side, preferably an upper portion when the EGR assembly 10 is oriented in a vehicle, of the longitudinal axis 18 of the airflow passage 12.

In the first embodiment, FIGS. 1–4, the recirculated exhaust gas passage 20 includes an inlet 24 and an outlet 26. The inlet cross-sectional area is oblique with the longitudinal axis 18. The outlet cross-sectional area is substantially parallel with the longitudinal axis 18. The parallel outlet configuration directly feeds recirculated exhaust gas into the airflow passage 12.

In the second embodiment, FIGS. 5–8, the recirculated exhaust gas passage 20 includes an inlet 24 and an outlet 26. The inlet cross-sectional area is obtuse with the longitudinal axis 18. The outlet cross-sectional area is substantially perpendicular to the longitudinal axis 18. A canal 28 is provided in the housing 16 to feed the recirculated exhaust gas from the recirculated exhaust passage 20 to the airflow passage 12.

The canal 28, preferably, comprises a canal formed at the edge of the housing 16 proximate the outlet end of both the airflow passage 12 and the recirculated exhaust gas passage 20. The canal 28 is formed in the housing 16 by a known die cast technique. In the preferred embodiment, the canal is cast when the housing 16 is cast. The housing 16, preferably, comprises aluminum.

When the EGR assembly 10 of the present invention is installed in an operative position against an intake manifold, a flange (not shown) of the intake manifold closes the canal. As discussed below, in the preferred embodiments of the invention, the airflow passage 12 has a circular cross-sectional area. Due to the preferred configuration of the airflow passage, the canal is arranged around this circular cross-sectional area, and, thus forms a radial canal. The radial canal 28 has a maximum flow area 30 proximate an intersection with the recirculated exhaust gas passage 20 and tapers around the airflow passage to a minimum flow area 32.

In the preferred embodiments of the invention, the valve mechanism 14 comprises a butterfly valve 34. The butterfly valve 34 is positioned at the inlet of the recirculated exhaust gas passage 20 provided in the housing 16. In a closed position, the butterfly valve 34 fully blocks the cross-sectional flow area of the inlet of the recirculated exhaust gas passage 20. The butterfly valve 34 includes a flap 36 that seals against a valve seat 38. A ring 40 is placed on the peripheral edge of the flap 36 to provide an appropriate sealed connection between the flap 36 and valve seat 38. The ring 40, preferably, is made of metal, however, ceramic may be used.

The flap 36, preferably, comprises stainless steel. A groove 42 is provided in the peripheral edge of the flap 36 to accommodate the ring 40. The ring 40 is a split ring that forms a compliant seal with the valve seat 38. The valve seat 38, preferably, comprises stainless steel.

The flap 36 is fixedly connected to a shaft 44 of the electric actuator 22. The flap 36 is provided with a central through hole 46 that receives the shaft 44. The shaft 44 is secured to the flap 36 by a weld 48. The shaft is welded to the flap 36 so that no further adjustments are required during production and operation of the EGR assembly 10.

The electric actuator 22 may comprise any system that converts an electrical input to a mechanical output to operate the valve mechanism 14. The selected electric actuator 22 should allow for at least an opening angle of 90° for the flap 36 from the closed position. For example, the electric actuator 22 could be a DC motor with at least one driver gear (for example, a spur or worm gear), a rotary torque motor, or a stepper motor.

In the preferred embodiments of the invention, a DC motor 50 with at least one spur gear (pinion gear 52) has been employed. The DC motor 50 is housed within the single housing 16. The DC motor 50 is contained within a support portion 54 of the housing 16 that is proximate the airflow passage. 12. The DC motor 50 is placed within the support portion 54 of the housing 16, and closed within the support portion 54 of housing 16 with a motor cover 56. As shown in the second embodiment of the invention, FIG. 6, an O-ring 58 and a spring washer 60 are also employed.

The pinion gear 52 of the DC motor 50 drives the shaft 44 through a segment gear-62. The pinion gear 52, preferably, comprises metal. In the first embodiment of the invention, FIGS. 1–4, the pinion gear 52 directly drives the segment gear 62. In the second embodiment of the invention, FIGS. 5–8 and 9A–9D, the pinion gear 52 drives an intermediate gear 64, and the intermediate gear 64 drives the segment gear 62. The segment gear 62 and intermediate gear 64, preferably, comprises an injection molded plastic.

The segment gear 62 is operatively connected to the shaft 44 so that movement (oscillation) of the segment gear 62 about an axis 66 of the shaft 44 places the flap 36 of the butterfly valve 34 into different metering positions. As shown in FIGS. 9A–9D, the second embodiment of the segment gear 62 includes a base 68 having a gear teeth sector 70, a solid cylindrical protrusion 72 extending from the base 68 in a first direction, and a pair of concentric walled cylindrical protrusions 74, 76 extending in a second direction, which is opposite the first direction.

The solid cylindrical protrusion 72 operates with the position sensor 78. The pair of concentric walled cylindrical protrusions include an inner protrusion 74 that fixedly attaches the shaft 44 to the segment gear 62, and an outer protrusion 76 that retains a spring 80 that biases the butterfly valve 34 to a closed position when no (load) current is applied to the DC motor 50.

The position sensor 78 is contained within a sensor assembly 82 mounted proximate the support portion 54 of the housing 16 that contains the DC motor 50. As shown in FIG. 1, in the first embodiment of the invention, the sensor assembly 82 is connected to a motor cover 56 that closes, by using fasteners 84, the DC motor 50 in the support portion 54 of the housing 16. The sensor assembly 82 is secured by fasteners 84, preferably, threaded fasteners, to the motor cover 56. Alternatively, as shown in FIGS.5–8 and 9A–9D, in the second preferred embodiment of the invention, the sensor assembly 82 is integrated on an exterior side of a mounting plate 86. The electric actuator 22 is attached to an interior side of the mounting plate 86. The sensor assembly 82 and the mounting plate 86 are integrated to form a single component. The mounting plate 86, by using fasteners 84, closes an open area of the support portion 54 of the housing 16 opposite the motor cover 56.

The spring 80, preferably, is a coil spring operatively positioned on a wall with the outer protrusion 76 of the segment gear 62. The outer protrusion 76 is provided with a tab 88 that secures an end of the coil spring 80. The other end of the coil spring 80 is secured to the housing 16. The coil spring 80 is selected such that the force applied to the segment gear 62, and, thus, the shaft 44, is adequate to position the flap 36 proximate the valve seat 38 when no load (current) is applied to the DC motor 50. The spring 80 is, preferably, stainless steel, and has with an adequate number of coils to provide the proper amount of torque on the shaft 44 to achieve the positioning of the flap 36 proximate the valve seat 38 so that the butterfly valve 34 is in a closed (no flow) position.

Due to the orientation of the butterfly valve 34 within the recirculated exhaust gas passage 20 and the associated connection with the electric actuator 22, the flap 36 of the butterfly valve 34 can achieve 360° of rotation. In operation, however, only 90° of rotation is needed. Because of the 360° operational span of the flap 36, only one mechanical stop for initialization of the EGR assembly 10 is required. The mechanical stop (not shown) is, preferably, an interior projection located within the housing 16.

The shaft 44 of the electric actuator 22 is supported by a pair of bearings 90, 92, which are disposed within the housing 16 proximate the airflow passage 12. The pair of bearings 90, 92 support the shaft 44 so that a portion of the shaft 44 lies within the airflow passage 12 and the axis 66 of the shaft 44 is substantially perpendicular to longitudinal axis 18 of the airflow passage 12. The pair of bearings 90, 92 includes a first bearing 90 located between the butterfly valve 34 and the airflow passage 12, and a second bearing 92 located between the airflow passage 12 and the electric actuator 22. The first bearing 90 is, preferably, a powdered metal bearing. The second bearing 92 is a needle bearing, which is a sealed bearing that reduces leakage from the airflow passage 12.

The first bearing 90 is located within a section of the housing 16 proximate the airflow passage 12 so that pressure on either side of the first bearing 90 is balanced when the butterfly valve 34 is in the closed position. This arrangement results in minimal pressure drop across the first bearing 90 during metering of the recirculated exhaust gas by the butterfly valve 34. The first bearing 90 is also located within a section of the housing 16 proximate the airflow passage 12 so that during metering of the recirculated exhaust gas only the first bearing 90 is exposed to the recirculated exhaust gas. When the butterfly valve 34 is in the closed position, both of the bearings 90, 92 are isolated from the recirculated exhaust gas.

In the preferred embodiments of the invention, the airflow passage 12 has a circular cross-section and forms a cylindrical volume within the housing 16. Other airflow passage configurations, however, may be used in accordance with packaging needs and flow requirements between the throttle body and the intake manifold of a vehicle. The longitudinal axis 18 of the airflow passage 12, in the preferred embodiments, extends through the center of the cylindrical volume.

In the first embodiment of the invention, FIGS. 1–4, the pair of bearings 90, 92 support the shaft 44 so that the axis 66 extending through the shaft 44 is substantially perpendicular to and offset from the longitudinal axis 18 of the airflow passage 12. Because of the offset arrangement of the axis 66 extending through the shaft 44 and the longitudinal axis 18 of the airflow passage 12, the cross-sectional areas disposed on either side of the shaft 44 are unequal semi-circular cross-sectional areas 94, 96. The air that passes through these unequal semi-circular cross-sectional areas 94, 96 provides heat dissipation conduits for the heat added to the shaft 44 by the exhaust gas that is being recirculated.

In the second embodiment of the invention, FIGS. 5–8, the pair of bearings 90, 92 support the shaft 44 so that the axis 66 extending through the shaft 44 is substantially perpendicular to and intersects the longitudinal axis 18 of the airflow passage 12. Because of the intersection of the axis 66 extending through the shaft 44 and the longitudinal axis 18 of the airflow passage 12, the cross-sectional areas disposed on either side of the shaft 44 are substantially equal semi-circular cross-sectional areas 98,100. These substantially equal semi-circular cross-sectional areas 98, 100 allow for maximum cooling of the shaft 44 from the air passing through these areas. Thus, the heat from the recirculated exhaust gas that is transferred to the shaft 44 is effectively dissipated. That is, the shaft 44 is cooled such that the heat from the recirculated exhaust gas does not affect operation of the segment gear 62, which is preferably plastic, or the position sensor 78.

The location of the electric actuator proximate the airflow passage is arranged in a manner to provide an efficient exhaust gas recirculation assembly packaging configuration. Although the electric actuator may be positioned in a variety of locations, the shaft extending through the airflow passage to operate the valve mechanism should be positioned so that the cross-sectional areas adjacent the shaft provide the desirable cooling effect necessary to ensure proper operation of the electric actuator and the position sensor.

It is also to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. An exhaust gas recirculation assembly, comprising: a housing comprising an airflow passage having a longitudinal axis and an exhaust gas recirculation passage communicating with the airflow passage; a valve mechanism comprising a butterfly disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; wherein the valve mechanism further comprises a valve shaft that is journaled on the housing for turning about its own valve shaft axis, the butterfly is disposed on an end of the valve shaft which is disposed to one side of an imaginary plane that contains the longitudinal axis of the airflow passage, an opposite end of the valve shaft is disposed to the other side of the imaginary plane and is operatively connected to the electric actuator, the electric actuator comprises an actuator shaft that turns about its own actuator shaft axis to turn the valve shaft, and the actuator shaft axis and the valve shaft axis are non-coaxial, but are mutually parallel.

2. An exhaust gas recirculation assembly as set forth in claim 1 in which the exhaust gas recirculation passage comprises an inlet whose cross-sectional area is oblique to the longitudinal axis of the airflow passage and an outlet whose cross-sectional area is substantially parallel with the longitudinal axis of the airflow passage.

3. An exhaust gas recirculation assembly as set forth in claim 1 in which the exhaust gas recirculation passage comprises an inlet whose cross-sectional area is oblique to the longitudinal axis of the airflow passage and an outlet whose cross-sectional area is substantially perpendicular to the longitudinal axis of the airflow passage.

4. An exhaust gas recirculation assembly as set forth in claim 1 in which the valve shaft passes through the airflow passage.

5. An exhaust gas recirculation assembly as set forth in claim 4 in which the valve shaft axis is disposed in intersecting relationship to the longitudinal axis of the airflow passage.

6. An exhaust gas recirculation assembly as set forth in claim 4 in which the valve shaft axis is disposed in non-intersecting relationship to the longitudinal axis of the airflow passage.

7. An exhaust gas recirculation assembly as set forth in claim 1 in which the butterfly is disposed oblique to the valve shaft.

8. An exhaust gas recirculation assembly, comprising: a housing comprising an airflow passage having a longitudinal axis and an exhaust gas recirculation passage communicating with the airflow passage at an outlet of the exhaust gas recirculation passage; a valve mechanism disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; the valve mechanism being disposed to one side of an imaginary plane that contains the longitudinal axis of the airflow passage; the actuator being disposed to the other side of the imaginary plane; the housing further comprising an inlet at which exhaust gas enters the exhaust gas recirculation passage; and wherein a cross-sectional area of the inlet is oblique to the longitudinal axis and a cross-sectional area of the outlet is substantially parallel with the longitudinal axis.

9. An exhaust gas recirculation assembly, comprising: a housing comprising an airflow passage having a longitudinal axis and an exhaust gas recirculation passage communicating with the airflow passage at an outlet of the exhaust gas recirculation passage; a valve mechanism disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; the valve mechanism being disposed to one side of an imaginary plane that contains the longitudinal axis of the airflow passage; the actuator being disposed to the other side of the imaginary plane; the housing further comprising an inlet at which exhaust gas enters the exhaust gas recirculation passage; and wherein a cross-sectional area of the inlet is oblique to the longitudinal axis and a cross-sectional area of the outlet is substantially perpendicular to the longitudinal axis.

10. An exhaust gas recirculation assembly, comprising: a housing comprising an airflow passage having a longitudinal axis and an exhaust gas recirculation passage communicating with the airflow passage; a valve mechanism disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; and the housing comprises a canal through which exhaust gas that has passed the valve mechanism enters the airflow passage and which is formed at an edge of the housing proximate an outlet end of both of the airflow passage and the exhaust gas recirculation passage.

11. An exhaust gas recirculation assembly, comprising: a housing comprising an airflow passage having a longitudinal axis and an exhaust gas recirculation passage communicating with the airflow passage; a valve mechanism disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; wherein the valve mechanism comprises a shaft that extends through the airflow passage and that can be turned about its own axis within the airflow passage, and the electric actuator comprises a D.C. motor having a driver gear that operates a segment gear via at least one intermediate gear to turn the shaft within the airflow passage, and wherein the segment gear includes a base having a gear teeth sector, a solid cylindrical protrusion extending from the base in a first direction, and a pair of concentric walled cylindrical protrusions extending in a second direction which is opposite the first direction.

12. An exhaust gas recirculation assembly, comprising: a housing comprising an airflow passage having a longitudinal axis and an exhaust gas recirculation passage communicating with the airflow passage; a valve mechanism disposed in the exhaust gas recirculation passage for selectively restricting the exhaust gas recirculation passage; an electric actuator for operating the valve mechanism to selectively restrict exhaust gas flow through the exhaust gas recirculation passage to the airflow passage; wherein the valve mechanism comprises a shaft that extends through the airflow passage and that is journaled for turning about its own axis within the airflow passage by a first bearing disposed between the valve mechanism and the airflow passage and a second bearing disposed between the airflow passage and the electric actuator, and wherein the bearings support the shaft so that the shaft axis is substantially perpendicular to and offset from the longitudinal axis of the airflow passage.

* * * * *